United States Patent
Lee

(10) Patent No.: US 12,089,578 B1
(45) Date of Patent: Sep. 17, 2024

(54) CRAB FISHING TRAP

(71) Applicant: Jong Lee, Mill Creek, WA (US)

(72) Inventor: Jong Lee, Mill Creek, WA (US)

( * ) Notice: Subject to any disclaimer, the term of this patent is extended or adjusted under 35 U.S.C. 154(b) by 20 days.

(21) Appl. No.: 18/114,249

(22) Filed: Feb. 25, 2023

(51) Int. Cl.
*A01K 69/06* (2006.01)

(52) U.S. Cl.
CPC .................................. *A01K 69/06* (2013.01)

(58) Field of Classification Search
CPC ............................. A01K 69/06; A01K 69/081
See application file for complete search history.

(56) References Cited

U.S. PATENT DOCUMENTS

| | | | | |
|---|---|---|---|---|
| 2,656,642 A * | 10/1953 | Richa | ............. | A01K 69/06 43/88 |
| 2,728,164 A * | 12/1955 | Mears | ............. | A01K 69/06 43/7 |
| 2,793,466 A * | 5/1957 | Esposito | ............. | A01K 69/06 43/87 |
| 3,553,881 A * | 1/1971 | Esposito | ............. | A01K 69/06 43/105 |
| 3,867,782 A * | 2/1975 | Ortiz | ............. | A01K 69/08 43/105 |
| 3,903,637 A * | 9/1975 | Dorsey | ............. | A01K 69/10 43/105 |
| 4,141,172 A * | 2/1979 | Prosol | ............. | A01K 69/06 43/105 |
| 4,216,607 A * | 8/1980 | Lyster | ............. | A01K 69/06 43/87 |
| 4,406,083 A * | 9/1983 | Hart | ............. | A01K 69/06 43/105 |
| 4,554,760 A * | 11/1985 | Ponzo | ............. | A01K 69/06 43/100 |
| 4,654,997 A * | 4/1987 | Ponzo | ............. | A01K 69/10 43/105 |
| 4,697,381 A * | 10/1987 | Esgro | ............. | A01K 69/00 43/100 |
| 5,842,304 A * | 12/1998 | Rivera | ............. | A01K 69/06 43/105 |
| 6,065,239 A * | 5/2000 | Thomas | ............. | A01K 74/00 43/4.5 |
| 6,247,264 B1 * | 6/2001 | Prosol | ............. | A01K 69/10 43/100 |
| 8,661,727 B2 * | 3/2014 | Alfarhan | ............. | A01M 23/20 43/62 |
| 10,375,940 B2 * | 8/2019 | Al-Farhan | ............. | A01K 97/12 |

* cited by examiner

*Primary Examiner* — Michael H Wang
(74) *Attorney, Agent, or Firm* — Seattle Patent Group LLC; James Haugen

(57) ABSTRACT

A wire structure may have a loop of fishing line on each of four sides, with weights to lower the line, giving a loop on each side. These loops may be tied to a central fishing line, which a user may pull to close the loops. This may catch a crab if one is in the trap, allowing a user to bring the crab to a wharf or boat, for example. Releasing the fishing line may allow the weights to lower, which may open the loops and release the crab without the user needing to touch the trap near the crab, which may reduce the chance of being pinched by a crab claw.

1 Claim, 2 Drawing Sheets

Crab Fishing Trap
200

CRAB FISHING TRAP

TECHNICAL FIELD

The instant disclosure relates to a trap for recreational crab fishing.

BACKGROUND

Recreational crab fishing is sport fishing for crabs, generally using baited traps or pots. Commonly caught species include Dungeness crab, blue crab, and king crab. Crabbing typically involves setting out baited traps or pots, waiting for the crabs to enter, and then pulling the traps or pots up to the surface to check and remove the crabs.

The traps are often connected to a fishing line, with a way to catch a claw of a crab. Removing the crab may be a dangerous undertaking, requiring opening a part of the trap to free the crab, which may allow the crab to pinch a user.

SUMMARY

The instant application provides a trap that allows a user to catch a crab, bring it to a dock or boat, for example, and release it from the trap safely, reducing a risk of being pinched.

A wire structure may have a loop of fishing line on each of four sides, with weights to lower the line, giving a loop on each side. These loops may be tied to a central fishing line, which a user may pull to close the loops. This may catch a crab if one is in the trap, allowing a user to bring the crab to a wharf or boat, for example. Releasing the fishing line may allow the weights to lower, which may open the loops and release the crab without the user needing to touch the trap near the crab, which may reduce the chance of being pinched by a crab claw.

DETAILED DESCRIPTION

In the following detailed description, specific details are set forth by examples. However, it should be apparent to those skilled in the art that the instant disclosure is not so limited and that the instant disclosure includes modifications to the specific examples described herein without departing from the spirit and scope.

Figure 1:
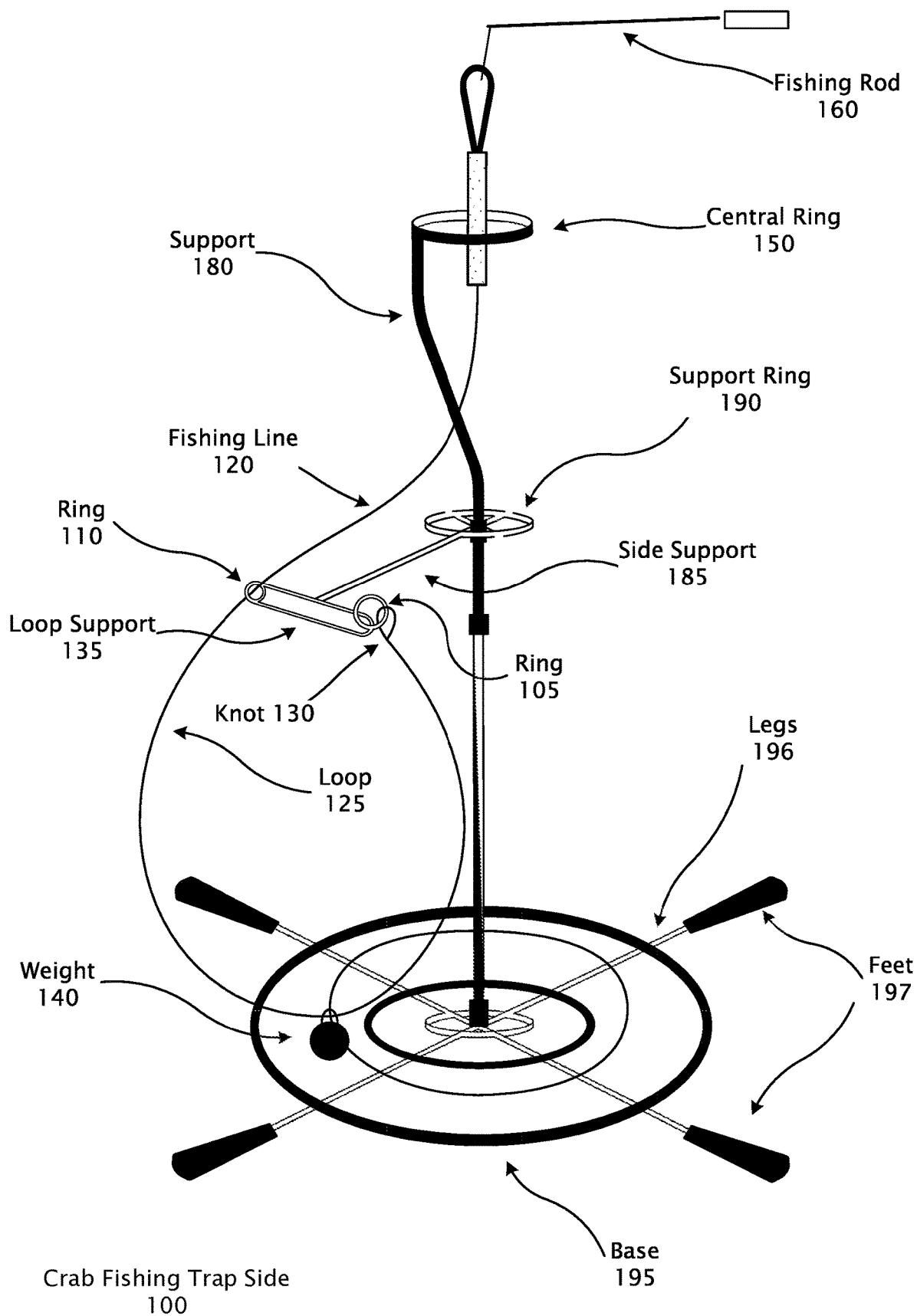
FIG. 1 illustrates one side and a central structure of a crab fishing trap, according to one implementation.

FIG. 1 illustrates Crab Fishing Trap Side 100 and part of a central structure of Crab Fishing Trap 200, according to one implementation. Crab Fishing Trap 200 may be made of a wire frame, or similar material. Fishing Rod 160 may couple with Fishing Line 120. Fishing Line 120 may pass through Central Ring 150, which may be oriented horizontally, and go radially outward through Ring 110. Fishing Line 120 may form Loop 125, between where it passes through Ring 110 and is tied off on Ring 105, with Weight 140 pulling that section of Fishing line 120 down. Fishing Line 120 may be tied to Ring 105 with Knot 130. Knot 130 may be a knot or other fastener to attach Fishing Line 120 to Rin 105 Fishing Line 120 may move freely through Central Ring 150 and Ring 110, which may allow Fishing Rod 160 to raise and lower Loop 125 of Fishing Line 120. Loop Support 135 may be coated with rubber to allow Fishing Line 120 to move consistently past it.

Support Ring 190 may provide a structure to hold Ring 105 and Ring 110 together, while Side Support 185 may couple Side Support 190 to Central Ring 150. Support 180 may hold Central Ring 150 off a floor of a body of water. Support 180 may also hold Bait Holder 220, which may contain bait, which may attract crabs to Crab Fishing Trap 200.

If a crab attempts to get the bait, a user may use Fishing Rod 160 to lift Fishing Line 120, which may pull up on Loop 125, which may catch a claw of the crab. Lifting Fishing Line 120 further may lift Crab Fishing Trap 200 out of the body of water, and the user may place Crab Fishing Trap 200 in a boat or on a wharf, for example. Loosening Fishing Line 120 may allow Loop 125 to relax, which may safely release the crab.

Crab Fishing Trap 200 may have Base 195, which may hold it upright on a floor of a body of water. Base 195 may have several concentric wire rings, coupled by Legs 196 radiating outward from a central area containing Support 180. Legs 196 may have Feet 197 at a far end, which may provide additional support for Crab Fishing Trap 200. Feet 197 may also help ensure that Crab Fishing Trap 200 lands upright if it is thrown into water. Without Feet 197, Crab Fishing Trap 200 is more likely to land on a side, which may not allow it to work properly. Feet 197 may have holes, which may allow water to pass through, which may reduce an amount of force required to pull Crab Fishing Trap 200 out of water.

Figure 2:
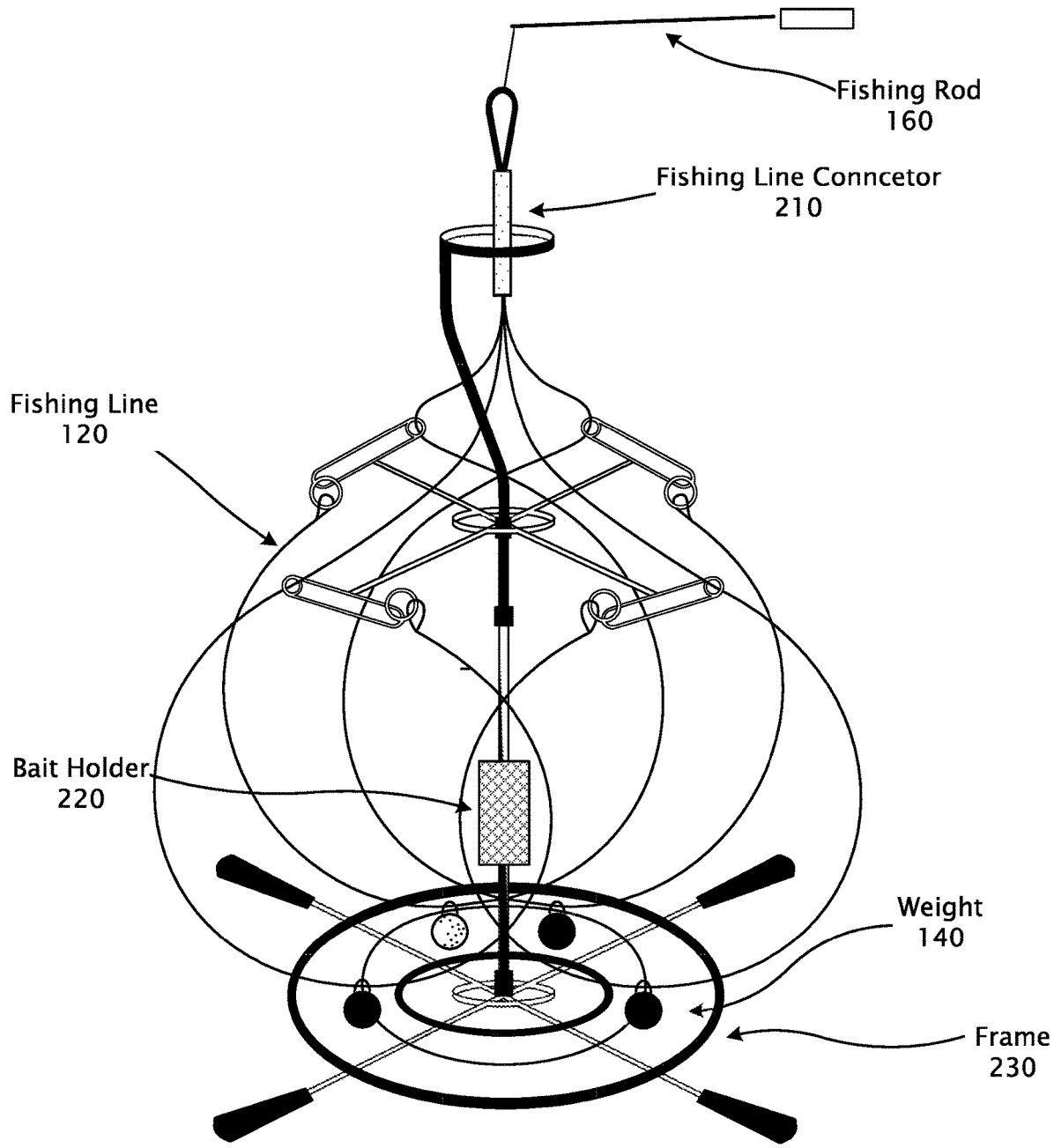
FIG. 2 illustrates a crab fishing trap, according to one implementation.

FIG. 2 illustrates Crab Fishing Trap 200, according to one implementation. Fishing Line Connector 210 may allow Fishing Rod 160 to lift Loop 125 on each of the four Crab Fishing Trap Side 100s. Bait Holder 220 may hold bait to attract crabs to Crab Fishing Trap 200. While this implementation has four Crab Fishing Trap Side 100s, other implementations may have three, five, or more. Having multiple Crab Fishing Trap Side 100s to encircle Bait Holder 220 may prevent a crab from getting bait without passing through Loop 125, thus allowing a user to catch the crab.

When a crab is caught, a user may lift the trap with the crab to a wharf or a boat, for example, using Fishing Rod 160. Releasing tension on Fishing Line 120 may allow Loop 125 to open, which may release the crab without the user needing to manually remove the crab from Crab Fishing Trap 200, which may reduce the chance of the user being pinched by a crab claw.

The foregoing description of various embodiments of the invention has been presented for the purposes of illustration and description. It is not intended to be exhaustive or to limit the invention to the precise form disclosed. It is intended that the scope of the invention be limited not by this detailed description, but rather by the claims appended hereto. The above specification, examples, and data provide a complete description of the manufacture and use of the invention. Since many embodiments of the invention can be made without departing from the spirit and scope of the invention, the invention resides in the claims hereinafter appended.

The invention claimed is:
1. A crab fishing trap, comprising:
   a wire frame, the wire frame comprising:
      a base, the base comprising one or more rings of wire oriented horizontally, coupled to each other with three or more wire legs radiating from a central area;

a support, comprising wire rising vertically from the central area of the base, with a support ring oriented horizontally, a central ring oriented horizontally, and coupled to a bait holder;

a fishing line, the fishing line entering the wire frame downward through the central ring, passing through a first loop support ring, the fishing line forming a loop, and tied to a second loop support ring, and a weight slidably coupled to the fishing line forming the loop; and a side support radiating outward from the support ring to a loop support, the loop support comprising the first loop support ring and the second loop support ring coupled to each other by a wire structure, the first loop support wing sized to allow the fishing line to move loosely through it.

\* \* \* \* \*